(12) United States Patent
Atoon

(10) Patent No.: US 7,922,810 B2
(45) Date of Patent: Apr. 12, 2011

(54) COMPRESSIVE STRENGTH IMPROVEMENT OF CEMENT AND GYPSUM PRODUCTS

(76) Inventor: Josef Atoon, Ramat Agolan (IL)

( * ) Notice: Subject to any disclaimer, the term of this patent is extended or adjusted under 35 U.S.C. 154(b) by 573 days.

(21) Appl. No.: 12/065,088

(22) PCT Filed: Aug. 29, 2006

(86) PCT No.: PCT/IL2006/000997
§ 371 (c)(1),
(2), (4) Date: Feb. 28, 2008

(87) PCT Pub. No.: WO2007/026352
PCT Pub. Date: Mar. 8, 2007

(65) Prior Publication Data
US 2008/0223259 A1    Sep. 18, 2008

Related U.S. Application Data

(60) Provisional application No. 60/711,694, filed on Aug. 29, 2005.

(51) Int. Cl.
*C04B 14/10* (2006.01)
*C04B 18/12* (2006.01)

(52) U.S. Cl. ........ 106/718; 106/724; 106/737; 106/738; 106/823; 705/400

(58) Field of Classification Search .................. 106/718, 106/724, 737, 738, 823; 705/400
See application file for complete search history.

(56) References Cited

U.S. PATENT DOCUMENTS

| | | | |
|---|---|---|---|
| 3,414,467 A | 12/1968 | Ferrara | |
| 6,695,545 B2 | 2/2004 | Boston | |
| 2003/0070589 A1 * | 4/2003 | Boston | ........................ 106/719 |

* cited by examiner

*Primary Examiner* — Paul Marcantoni
(74) *Attorney, Agent, or Firm* — Mark M. Friedman

(57) ABSTRACT

The invention relates generally to a cement or gypsum composition having improved properties, which is prepared by incorporating an enzyme into a cement material such as a cement, mortar, or concrete, or into a gypsum product. The invention also relates to methods of manufacturing improved cement compositions and gypsum products, methods of improving the compressive strength of cement compositions and gypsum products, and methods of reducing the cost of such compositions by enabling the use of less expensive aggregates in the manufacturing process. More specifically, the invention relates to a cement composition or a gypsum composition, optionally including at least one aggregate and optionally including at least one pozzolan, comprising a cement material or gypsum optionally including aggregate(s) and pozzolan(s) having blended therein an enzyme.

1 Claim, No Drawings

COMPRESSIVE STRENGTH IMPROVEMENT OF CEMENT AND GYPSUM PRODUCTS

FIELD OF THE INVENTION

The invention relates generally to a cement or gypsum composition having improved properties, which is prepared by incorporating an enzyme into a cement material such as a cement, mortar, or concrete, or into a gypsum product. The invention also relates to methods of manufacturing improved cement and gypsum products and methods of improving the compressive strength of cement and gypsum products. More specifically, the invention relates to a cement or gypsum composition comprising a cement material or a gypsum material having blended therein an enzyme.

BACKGROUND OF THE INVENTION

Cement is very important as an ingredient of mortar, concrete and the like. Various cement additives have been investigated to date and commercially utilized for facilitating working of mortar and concrete and for improving the strength, water impermeability and other properties of concrete structures. The present invention relates to compositions and methods for improving the compressive strength of cement and gypsum products.

Gypsum is a common mineral (hydrated calcium sulphate, $CaSO_4 \cdot 2H_2O$) used to make cements and plasters, especially plaster of Paris, walls, and sheetrock. Gypsum is also used worldwide in concrete for highways, bridges, buildings, and many other structures. Gypsum products include wallboard, plaster, plasterboard, molding, ornamental moldings, statuary, and architectural plaster work. There is a continuing need to increase the flexural strength of gypsum products to avoid cracking and breakage.

Cement, in various forms, has been used to bind materials together for centuries. However, the construction industry has been completely revolutionized since modern concrete was put into general use at the turn of the century. Although the two words concrete and cement are used interchangeably, cement is actually one of the ingredients in concrete.

Cement is a fine, soft, gray powder made from a mixture of limestone, clay, sand and/or shale. Making cement involves taking these natural materials, crushing them, burning this into clinker and grinding it into cement powder. When cement is mixed with water, it binds sand and gravel or crushed stone into a hard, solid mass known as concrete. Ordinary Portland cement is regular cement without any additives. Different types of cement, such as rapid hardening cement white cement and sulfate resisting cement are made by using additives or by variations in the manufacturing process. Cement mixed with water and sand forms cement plaster. Cement mixed with water, lime and sand forms mortar.

Concrete is manufactured by mixing water, cement and aggregates into a smooth composition that is cast and allowed to harden into silicate hydrates. Aggregates or fillers are any appropriate particulate matter, typically sand, gravel or crushed stone, or soil. The construction industry has taken considerable strides forward over the last two or three decades with regard to improving compressive strength of cement products, by adding materials called pozzolans that are capable of setting and hardening under water. The most commonly used pozzolans in the industry today are by-products of other industries, such as coal fly-ash, blast furnace slag, rice hull ash, silica fume, or metakaoli. Other suitable pozzolanic materials include gypsum, gypsum fines, portland cement, cement kiln dust, time dust, stone dust, and plaster of Paris. Another approach is adding additives as plasticizers and superplasticizers.

Cement manufacture requires enormous heat and consumes a great deal of energy. The process of manufacturing cement also generates large quantities of $CO_2$ that pollutes the earth's atmosphere. The burning of fossil fuels to heat the kiln to make cement causes greenhouse gases that are harmful to the environment and releases particulates into the air that makes breathing difficult. For every ton of cement produced, roughly ½ a ton of $CO_2$ (greenhouse gas) is released by the burning fuel, and an additional ½ ton is released in the chemical reaction that changes raw material to clinker, making the production of cement responsible for more than 8% of carbon dioxide emissions globally. Thus, cement manufacture is expensive not just to the consumer, but to the atmosphere as well. There is increased pressure for cement producers to comply with legislation regarding emissions.

Due to economic and environmental concerns, different methods of making cement products are being considered. One method to achieve the goal of reducing carbon dioxide emissions and greenhouse gases is to formulate cements using a lower portion of calcinated material, thereby reducing carbon dioxide emissions per unit of product. As cement and gypsum are expensive, there is a need to reduce costs by using less cement and/or gypsum for the same requirements, i.e., without compromising on the strength of the material and the pressure loads it can withstand. Thus, there is a need for methods and compositions that increase the compressive strength of cement and the flexural strength of gypsum products so that less cement or gypsum is needed for the same requirements, reducing cement production and the concomitant release of $CO_2$ into the atmosphere. As cement manufacture is energy intensive, using less cement would also have the beneficial effect of saving energy and reducing pollution.

Accordingly, a need exists for improved cement and gypsum products that have increased compressive strength and/or flexural strength yet include a lower percentage of cement and/or gypsum than standard cement or gypsum products, which is economical, durable, suitable for all types of applications, and benefits the environment.

Additionally, a need exists for improved cement and gypsum products that permit use of less expensive aggregates to reduce the cost of the cement product.

SUMMARY OF THE INVENTION

We have discovered that when an enzyme is added to a building material selected from the group consisting of cement, cement materials and gypsum products, there is attained an unexpectedly superior water reducing effect and a highly improved compressive strength and flexural strength, at a very low blending ratio of the enzyme additive based on the building material. Furthermore, use of the enzyme enables use of less expensive aggregates that are available locally such as clay, local soil and quarry byproducts in the manufacture of cement and gypsum products, aggregates that are ordinarily not suitable for such manufacture. This reduces the cost of cement or gypsum product manufacture as cheaper local alternatives may be used in place of the relatively more expensive aggregates typically used in concrete and gypsum manufacture, such as yellow sand, gravel, or soil that must be trucked in from a distance.

The enzyme, according to the present invention, can be used in combination with other cement additives such as air entraining agents, cement swelling and dispersing agents, water proofing agents, strength enhancing agents and hardening promoters, among others. Cements customarily used for preparing concrete and mortar, such as Portland cement, blast furnace cement, silica cement, alumina cement, diatomaceous earth cement, trass cement, slag cement and shale ash cement, can be used as the cement in the present invention.

According to the invention, the enzyme is incorporated by mixing or blending it into the building material, i.e., into cement, gypsum, a cement material optionally including at least one aggregate and optionally at least one pozzolan, or a gypsum product optionally including at least one aggregate and optionally at least one pozzolan. The enzyme is added in an amount of from about 1 liter of enzyme to about 30-35 cubic meters of cement, and preferably from about 1 liter of enzyme to about 33 cubic meters of cement, where the cement optionally includes at least one aggregate and optionally includes at least one pozzolan.

A cement composition as used herein is defined as any composition including cement, including, but not limited to, cement, concrete, mortar, or gypsum product. Using the cement composition of the invention including an enzyme in a concrete formulation enables reductions from between 100% to 400% less Portland cement as compared to the amount of cement typically used in a standard concrete formulation not including an enzyme. Since Portland cement is typically the most expensive constituent of concrete, the affordability of concrete is greatly improved. Not only is less cement needed to achieve the same characteristics or quality of the building material, additional cost reductions may be realized by use of less expensive aggregates. Rather than expensive yellow sand, gravel, or soil typically required in manufacture of concrete, cheaper aggregates such as clay, local soil and quarry byproducts may be substituted when using the composition of the invention including an enzyme without affecting the strength or flexure characteristics of the resultant material. Using the composition of the invention has the added benefit of offering strength and performance-improvement, as the pressure loads that can be withstood by the resulting cement and gypsum products is increased. Thus, less cement and/or gypsum are needed for the same requirements. Use of the composition yields a higher strength cement or gypsum product, of dramatically reduced permeability, that is able to withstand or counter harsh environmental conditions that may be adverse to concrete, such as weather conditions, and exposure to salt water, de-icing chemicals and acids.

The above features and advantages of the present invention will be better understood with reference to the accompanying figures, detailed description, and examples. It should also be understood that the particular methods and formulations illustrating the present invention are exemplary only and not to be regarded as limitations of the present invention. The invention may be practiced in various other ways and is capable of other embodiments. Also, it is contemplated that the phraseology and terminology used herein are for purposes of description and should not be regarded as limiting.

DETAILED DESCRIPTION OF THE PREFERRED EMBODIMENTS

As described below a cement composition is provided having increased compressive strength as compared to standard cement, said composition comprising cement water, optionally at least one aggregate and optionally at least one pozzolan, said composition including about 1 liter of enzyme to about 30-35 cubic meters of cement, and preferably from about 1 liter of enzyme to about 33 cubic meters of cement, where the cement optionally includes at least one aggregate and optionally includes at least one pozzolan.

In another embodiment of the invention, there is provided a gypsum product composition having substantially the same compressive strength and increased flexural strength as compared to standard gypsum products, said composition comprising gypsum, water and, optionally, at least one aggregate and optionally at least one pozzolan, said composition including about 1 liter of enzyme to about 30-35 cubic meters of gypsum, and preferably from about 1 liter of enzyme to about 33 cubic meters of gypsum, where the gypsum optionally includes at least one aggregate and optionally includes at least one pozzolan.

According to a further embodiment of the invention, the present invention relates to novel compositions of matter including cement, optionally including at least one aggregate and optionally including at least one pozzolan, mixed with at least one enzyme.

According to another embodiment, the invention relates to concrete formed from the aforementioned cement composition.

According to yet another embodiment of the invention, the invention relates to concrete formed from the aforementioned cement composition wherein the concrete has substantially at least the same or greater compressive strength as standard concrete and includes only from about 2%-6% by weight of cement, as compared to standard concrete which includes between 12%-15% of cement. Thus, concrete formed in accordance with the invention realizes a reduction in cement content of over 100% up to 400% less cement than standard concrete that does not include an enzyme.

According to still another embodiment of the invention, the invention relates to a method of manufacturing concrete comprising mixing cement, optionally including at least one aggregate and optionally including at least one pozzolan, with an enzyme solution.

According to yet another embodiment, there is provided a method of manufacturing a gypsum product including mixing gypsum, optionally including at least one aggregate and optionally including at least one pozzolan, with an enzyme solution.

According to another embodiment, the invention relates to use of at least one soil stabilization enzyme with any composition that includes cement, optionally at least one aggregate and optionally at least one pozzolan, and water, to increase the compressive strength of a cement composition.

According to still another embodiment, the invention relates to use of at least one soil stabilization enzyme with any composition that includes gypsum and water and optionally at least one aggregate and optionally at least one pozzolan, to increase the flexural strength of a gypsum product composition.

According to yet another embodiment, the invention provides for a method of reducing the amount of cement in a concrete composition comprising the step of combining enzyme with water and mixing the diluted enzyme with cement optionally including at least one aggregate and optionally including at least one pozzolan.

According to another embodiment, the invention provides a method of reducing the amount of gypsum in a gypsum product comprising the step of combining enzyme with water and mixing the diluted enzyme with gypsum, optionally including at least one aggregate and optionally including at least one pozzolan.

According to a further embodiment, the invention provides a method of reducing the cost of a cement composition by substituting an inexpensive aggregate (i.e., clay, local soil, or quarry byproducts) for a more expensive aggregate (i.e., gravel, sand, soil or other aggregate(s) not considered cheap aggregates) in the cement composition comprising mixing an enzyme with water, and mixing the enzyme/water mixture with cement and an inexpensive aggregate. If aggregate is added to the composition, it is preferred that between 10%-20% of small particle size aggregate be present. A small particle size aggregate is one which can fill the spaces between large size particles, as is known in the art.

The enzyme may be selected from a number of commercially available products, including, but not limited to, vegetable based enzymes formed from cane sugars or from grapes, enzymes used in detergents, and other enzymes which have soil stabilization capabilities. One exemplary enzyme which has soil stabilization capabilites, provided as a non-limiting example, are products sold under the designation "Nutra-Bond Plus", sold by Specialty Sales LLC, of Hollister, Calif. The enzyme is capable of setting and hardening and it physically stabilizes the cement/gypsum product when hydrated. Thus, the enzyme increases the compaction, cohesion, impermeability and water-repellency of the cement or gypsum product, and decreases plasticity. At the same time, it increases the compressive strength and load capacity of the cement or gypsum product.

The cement may comprise cements customarily used for preparing concrete and mortar, such as standard mixing cement, Portland cement, blast furnace cement, silica cement, alumina cement, diatomaceous earth cement, trass cement, slag cement and shale ash cement or any other type of cement typically used. The aggregate is typically selected from the group consisting of sand, gravel, soil and any appropriate particulate matter, as is known to those skilled in the art. These aggregate materials are typically relatively expensive. However, using the compositions and methods of the invention, it is possible to substitute cheaper aggregates selected from the group consisting of clay, local soil and quarry byproducts that may be locally available in place of the relatively more expensive aggregates in formulating cement and cement products such as concrete. Thus, costs reductions are possible by using cheaper local materials and avoiding the use of more expensive aggregates that must be trucked in from long distances. The water may be potable, non-potable or salt water.

The composition enhances compaction and reduces permeability of the building material, i.e., the cement product or gypsum product. The ratio of enzyme to cement and water varies depending on the type of cement product or gypsum product being manufactured. The type of aggregate included is not critical so long as there is present a minimum concentration of small particle size aggregate to function as a binder for larger size particles when water and enzyme is added. If aggregate is added to the composition, it is preferred that between 10%-20% of small particle size aggregate be present. Typically, higher volumes of enzyme are required when it is desired to increase the compressive strength of the building material and may require different formulations of ingredients, as illustrated in Examples 1, 3 and 5 below. Sufficient quantities of at least one enzyme are added to achieve the desired compressive strength or flexural strength characteristics of the cement or gypsum product that optionally includes at least one aggregate and optionally includes at least one pozzolan, while reducing the amount of cement or gypsum present in the product as compared to standard cement and gypsum products.

The preferred amount of enzyme, water and cement to use is calculated in accordance with parameters described in the Tables appearing in Examples 1, 3 and 5 below. Illustrative examples of such calculations are presented in Examples 2, 4 and 6 below. A control cement composition is described in Examples 7 and 8, and a gypsum composition is described in Example 9.

As shown in Table V in Example 10 below, the cement composition of the invention has at least almost the same compressive strength of standard cement at day 21 while containing substantially less cement. Typically, the cement content in concrete ranges from 12% to 15%. Using the composition of the invention, the cement content in cement products, such as concrete, may be reduced from 12%-15% to between 2%-6%. Thus, the cement composition of the invention reduces the needed quantity of cement in the composition from between over 100% up to 400% as compared to cement content in standard concrete without negatively affecting the compressive strength of the cement composition, and in some embodiments while positively affecting the compressive strength of the cement composition.

Thus, by using the cement composition of the invention including an enzyme, costs can be reduced by using less expensive aggregate and a smaller quantity of cement and/or gypsum to achieve a building material having the same or better compressive strength and/or flexural strength characteristics or quality as standard cement, concrete or gypsum products manufactured without an enzyme.

There is no limitation on the temperature at which the enzyme solution is mixed with cement or gypsum. Preferably, the enzyme is mixed with the cement mixture or gypsum at temperatures in the range of 0° C. and about 42° C. Preferably, the enzyme is mixed at a temperature where the enzyme is not significantly denatured and is substantially active.

The concentration of enzyme to be mixed with cement or gypsum will vary in accordance with calculations determined as set forth in Table I, II or III in Examples 1, 3 and 5 below, or, where applicable, depending on the manufacturers' guidelines for use.

The typical application process for cement products in the construction industry using the composition of the invention in accordance with the invention is as follows: A cement composition is prepared by diluting the enzyme with water to provide a satisfactory dispersion of the enzyme in the water. The amount of enzyme added to water is proportional, and will vary depending on the volume/weight or density of the material, including aggregate(s) and/or pozzolan(s), as set forth in Examples 1, 3 and 5 below. As an example of the ratio of enzyme to cement product, i.e., cement, or concrete, or mortar, etc., 1 liter of enzyme is added for each 30-35 cubic meters of cement and preferably 1 liter of enzyme is added for each 33 cubic meters of cement, where the cement optionally includes aggregate(s) and pozzolan(s), depending on the formulation.

At the same time, cement or a cement mixture is prepared by mixing cement optionally with at least one aggregate (i.e., sands gravel, soil, or other appropriate particulate matter, and preferably with at least one aggregate selected from the group consisting of clay, local soil and quarry byproducts) and optionally at least one pozzolan. The amount of cement is proportional to the compressive strength desired and the density of the materials utilized.

The diluted enzyme in water is mixed with the cement or cement mixture and blended or mixed to form a cement composition. The composition is then applied using standard procedures including vibration, compaction, injection or extrusion as is known in the art.

The typical application process for gypsum products in accordance with the invention is as follows: A gypsum composition is prepared by diluting the enzyme with water to provide a satisfactory dispersion of the enzyme in the water. The amount of enzyme added to water is proportional, and will vary depending on the volume/weight or density of the material, including aggregate(s) and/or pozzolan(s), as set forth in Example 9 below. As an example of the ratio of enzyme to gypsum product, about 1 liter of enzyme is about to about 30-35 cubic meters of gypsum, and preferably about 1 liter of enzyme is added to about 33 cubic meters of gypsum, where the gypsum optionally includes at least one aggregate and optionally includes at least one pozzolan.

At the same time, gypsum or gypsum mixed with at least one aggregate, pozzolan or other additive is prepared. The amount of gypsum added is proportional to the compressive strength desired and the density of materials utilized.

The diluted enzyme in water is blended or mixed with the gypsum or gypsum mixture and blended to form a gypsum product composition. The composition is then applied using standard procedures including vibration, compaction, injection or extrusion as is known in the art.

The enzyme dispersed in water is combined with the cement or gypsum optionally including at least one aggregate and optionally at least one pozzolan, such that it is blended or mixed or incorporated into the cement or gypsum mixture.

One skilled in the art will be familiar with techniques for applying the composition. The invention has application to any product that includes cement such as concrete, concrete blocks for pavements, concrete tiles, cement boards, blocks for building and more. A particularly preferred application of the cement and gypsum compositions of the invention is for road applications.

The invention has application to gypsum products particularly as to increasing the flexural strength and reducing the amount of gypsum used in the composition by substituting some of the gypsum with at least one aggregate that is less expensive than the soil, sand and gravel typically used as aggregates, i.e., by substituting with at least one less expensive aggregate selected from the group consisting of clay, local soil and quarry byproducts. Examples of gypsum products include gypsum boards, gypsum blocks, plasters, etc.

The following examples are intended to illustrate, but not to limit, the scope of the invention. Indeed, those of ordinary skill in the art can readily envision and produce her embodiments, based on the teachings herein, without undue experimentation. All references to "%" is by weight unless otherwise indicated.

EXAMPLE 1

Calculations for Cement Composition Including Enzyme

TABLE I

| | Determination of Material Type | Calculation | Example |
|---|---|---|---|
| A | Density (Kg/M$^3$ dry) | Kg | 1970.0000 |
| B | Optimum Moisture (for compaction) | % | 17.4000 |
| C | Less existing moisture (lab tested) | % | 10.0000 |
| D | Net moisture to be added (B − C) | % | 7.4000 |
| E | Water required per M$^3$ (A · D) | Kg | 145.7800 |
| F | Water (weight of 1 liter) | 0.995 Kg | 0.9950 |
| G | Water Required per M$^3$ | Liters | 146.5126 |
| H | Total M$^3$ (volume to be processed) | M$^3$ | 0.0050 |
| I | Total water required (G · H) | Liters | 0.7326 |
| J | Actual water to use (70% of I) | Liters | 0.5128 |

Explanatory Notes:
"A" represents the density of the material used, i.e., cement, concrete, mortar, or gypsum product, optionally including at least one aggregate and optionally including at least one pozzolan. In this example, the material is concrete.
1 M$^3$ of water = 1000 liters of water.

EXAMPLE 2

Cement Composition Including Enzyme

In accordance with the calculations set forth in Table I of Example 1, the following relative proportions of cement (optionally including at least one aggregate and optionally at least one pozzolan), water and enzyme are preferably used to prepare concrete:

| | |
|---|---|
| Cement required per M$^3$ (A · H · 2%, where 2% is the amount of cement used) = | 0.1970 Kg |
| M$^3$ of water = | 0.0005 |
| Enzyme = | 0.0002 Liters |

The enzyme is preferably "Nutra-Bond Plus", sold by Specialty Sales LLC, of Hollister, Calif.

Thus, the preferred ratio of enzyme to cement is 1 liter of enzyme per 33 M$^3$ of cement used, where the cement optionally includes aggregate(s) and pozzolan(s). In the example above, calculations were based on a material having a cement content of 2%.

It is contemplated that various formulations of the present invention may be devised with respect to different types of cement/aggregates/pozzolans or gypsum materials in accordance with Table I, optionally with the addition of various additives. The amounts of water and optionally aggregate/pozzolan may be adjusted without changing the total volume.

EXAMPLE 3

Calculations for Cement Composition Including Enzyme

TABLE II

| | Determination of Material Type | Calculation | Example |
|---|---|---|---|
| A | Density (Kg/M$^3$ dry) | Kg | 1996.0000 |
| B | Optimum Moisture (for compaction) | % | 11.1000 |
| C | Less existing moisture (lab tested) | % | 0.0000 |
| D | Net moisture to be added (B − C) | % | 11.1000 |
| E | Water required per M$^3$ (A · D) | Kg | 221.556 |
| F | Water (weight of 1 liter) | 0.995 Kg | 0.9950 |
| G | Water Required per M$^3$ | Liters | 222.6693 |
| H | Total M$^3$ (volume to be processed) | M$^3$ | 0.0050 |
| I | Total water required (G · H) | Liters | 1.1133 |
| J | Actual water to use (70% of I) | Liters | 0.7793 |

Explanatory Notes:
"A" represents the density of the material used, i.e., cement, or gypsum product, optionally including at least one aggregate and optionally including at least one pozzolan. In this example, the material is concrete.
1 M$^3$ of water = 1000 liters of water.

EXAMPLE 4

Cement Composition Including Enzyme

In accordance with the calculations set forth in Table II of Example 3, the following relative proportions of cement (optionally including at least one aggregate and optionally at least one pozzolan), water and enzyme are preferably used:

| | |
|---|---|
| Cement required per M$^3$ (A · H · 4%, where 4% is the amount of cement used) = | 1.996 Kg |
| M$^3$ of water = | 1.1133 |
| Enzyme = | 0.0002 Liters |

The enzyme is preferably "Nutra-Bond Plus", sold by Specialty Sales LLC, of Hollister, Calif. Thus, the preferred ratio of enzyme to cement is again 1 liter of enzyme per 33 $M^3$ of cement used, where the cement optionally includes aggregate(s) and pozzolan(s). The nature and type of the aggregate and pozzolan are relevant only insofar as their density affects the calculation of "A". In the example above, calculations were based on a material having a cement content of 4%.

EXAMPLE 5

Calculations for Cement Composition Including Enzyme

TABLE III

| Determination of Material Type | Calculation | Example |
| --- | --- | --- |
| A Density (Kg/$M^3$ dry) | Kg | 1776.0000 |
| B Optimum Moisture (for compaction) | % | 10.2000 |
| C Less existing moisture (lab tested) | % | 0.0000 |
| D Net moisture to be added (B − C) | % | 10.2000 |
| E Water required per $M^3$ (A · D) | Kg | 181.1520 |
| F Water (weight of 1 liter) | 0.995 Kg | 0.9950 |
| G Water Required per $M^3$ | Liters | 182.0623 |
| H Total $M^3$ (volume to be processed) | $M^3$ | 0.2000 |
| I Total water required (G · H) | Liters | 36.4125 |
| J Actual water to use (70% of I) | Liters | 25.4887 |

Explanatory Notes:
"A" represents the density of the material used, i.e., cement, or gypsum product, optionally including at least one aggregate and optionally including at least one pozzolan. In this example, the material is concrete.
1 $M^3$ of water = 1000 liters of water.

EXAMPLE 6

Cement Composition Including Enzyme

In accordance with the calculations set forth hi Table III in Example 5, the following relative proportions of cement (optionally including at least one aggregate and optionally at least one pozzolan), water and enzyme are preferably used:

| | |
| --- | --- |
| Cement required per $M^3$ (A · H · 2%, where 2% is the amount of cement used) = | 7.1040 Kg |
| $M^3$ of water = | 0.0255 |
| Enzyme = | 0.0061 Liters |

The enzyme is preferably "Nutra-Bond Plus", sold by Specialty Sales LLC, of Hollister, Calif. Thus, the preferred ratio of enzyme to cement is again 1 liter of enzyme per 33 $M^3$ of cement used, where the cement optionally includes aggregate(s) and pozzolan(s). In the example above, calculations were based on a material having a cement content of 2%. The nature and type of the aggregate and pozzolan are relevant only insofar as their density affects the calculation of "A".

EXAMPLE 7

Concrete Composition Control Sample

TABLE IV

| Determination of Material Type | Calculation | Example |
| --- | --- | --- |
| A Density (Kg/$M^3$ dry) | Kg | 2350.0000 |
| B Optimum Moisture (for compaction) | % | 5.5000 |
| C Less existing moisture (lab tested) | % | 0.0000 |

TABLE IV-continued

| Determination of Material Type | Calculation | Example |
| --- | --- | --- |
| D Net moisture to be added (B − C) | % | 5.5000 |
| E Water required per $M^3$ (A · D) | Kg | 129.2500 |
| F Water (weight of 1 liter) | 0.995 Kg | 0.9950 |
| G Water Required per $M^3$ | Liters | 129.8995 |
| H Total $M^3$ (volume to be processed) | $M^3$ | 0.1000 |
| I Total water required (G · H) | Liters | 12.9899 |
| J Actual water to use (70% of I) | Liters | 9.0930 |

Explanatory Notes:
"A" represents the density of the material used, i.e., cement, optionally including at least one aggregate and optionally including at least one pozzolan. The nature and type of the aggregate and pozzolan are relevant only insofar as their density affects the calculation of "A".
1 $M^3$ of water = 1000 liters of water.

EXAMPLE 8

Concrete Composition Control Sample

In accordance with the calculations set forth above in Table IV of Example 7, the following relative proportions of cement (optionally including at least one aggregate and optionally at least one pozzolan) and water are preferably used for the control:

| | |
| --- | --- |
| Cement required per $M^3$ (A · H · 12%, where 12% is the amount of cement used) = | 28.2000 Kg |
| $M^3$ of water = | 0.0091 |

In the example above, calculations were based on a composition having a cement content of 12%. The nature and type of the aggregate and pozzolan are relevant only insofar as their density affects the calculation of "A".

EXAMPLE 9

Gypsum Product Compositions

TABLE V

| | GYPSUM | GYPSUM + ENZYME | GYPSUM + CLAY + ENZYME |
| --- | --- | --- | --- |
| Gypsum | 1.5 | 1.5 | 0.75 |
| Water | 0.75 | 0.75 | 0.424 |
| Enzyme | 0 | 0.5 ml. | 1 ml. |
| Clay | 0 | 0. | 0.75 |
| Proportion of gypsum:water | 0.5 | 0.5 | 0.57 |
| Flexural Strength (24 hours) | 4.1 | 4.2 | 2.8 |
| Compressive Strength (24 hours) | 13.5 | 13.6 | 8 |
| Flexural Strength (7 Days) | 5.5 | 7.3 | 7.35 |
| Compressive Strength (7 Days) | 25.9 | 26 | 18.8 |
| Flexural Strength (28 Days) | 6.5 | 7.4 | 5.8 |
| Compressive Strength (28 Days) | 26 | 26 | 17.5 |

Results and Discussion:
Table V shows three formulations of gypsum products:
(1) gypsum (control);
(2) gypsum+enzyme; and
(3) gypsum+clay (a type of aggregate)+enzyme
The flexural strength and compressive strengths of the three gypsum formulations were tested and compared after 24 hours, 7 days and 28 days. Compressive strength tests indicate no change in compressive strength due to the presence of the enzyme in gypsum composition (2) after 28 days, as compared to gypsum composition (1). More importantly, results of flexural strength tests indicate a substantial improvement in flexural strength for gypsum composition (2) that includes an enzyme after 7 days and after 28 days as compared to gypsum composition (1). Gypsum composition (3) achieved superior flexural strength but lower compressive strength as compared to control gypsum composition (1). Thus, the addition of an enzyme to gypsum compositions is an effective additive in the development of more flexible gypsum products, a desirable property for gypsum products such as wall boards, etc. By varying the amount of the enzyme added, higher flexural strengths are attainable. It is understood that various gypsum compositions including an enzyme may be formulated to meet specific construction challenges or applications.

EXAMPLE 10

The compressive strength test results for samples taken from Examples 2, 4 and 6 and the control sample of Example 8 are shown in Table V (measured compressive strengths). Cement content is indicated in Table VI.

The compressive strength of cement was determined as follows: The accepted laboratory means for measuring compressive strength is to test 2 in. (50×50 mm) cubes of cement specimens. The compressive strength is tested by measuring the force needed to break the concrete cubes at proscribed intervals as they harden. Compressive strength tests are conducted using an instrumented hydraulic ram to compress the cubic sample to failure. The units used to measure compressive strength are Newtons per square millimeter, or N/mm2. The strength of concrete increases as the cement content increases for a fixed amount of water. Concrete strength increases with time where moisture is available. However, it is accepted that around 80% of the strength is reached at an age of 28 days and so this is the length of time a concrete cube is stored, in controlled conditions before testing.

TABLE V

MEASURED COMPRESSIVE STRENGTHS

| Sample | Compressive Strength (N/mm2) | | |
|---|---|---|---|
| | Day 7 | Day 14 | Day 21 |
| Example 2 | 44.9 | 39.1 | 58.7 |
| Example 4 | 38 | 41.8 | 52.8 |
| Example 6 | 37.5 | 42.4 | 57.4 |
| Average | 40.1 | 41.1 | 56.3 |
| Control | | | 60.5 |

TABLE VI

CEMENT CONTENT

| | |
|---|---|
| Example 2: | 2% |
| Example 4: | 4% |
| Example 6: | 2% |
| Control: | 12% |

Results and discussion: Seven, fourteen, and twenty-one day compressive strengths are reported in Table V for samples prepared in accordance with Examples 2, 4 and 6, and the Control cement composition of Example 8, and an average is reported for each day. Typical compressive strengths for concrete range from as low as 20 N/mm2 for ordinary concrete to as high as 65 N/mm2 for structural concrete. Applicant has achieved impressive average results of 56.3 N/mm2 on Day 21, as compared to the control of 60.5 on Day 21, using remarkably less cement (2% vs. 12% for the control). Thus, the cement compositions of the invention including an enzyme exhibit a marked increase in compressive strength over the control composition. From these results, it is seen that when an enzyme is added to a cement composition, the compressive strength is improved. It is important to point out that a period of twenty-one days may not be sufficient for the development of fall marginal potential strengths for the concrete samples. Generally, greater strengths are expected for later day (past 28 days) measurements.

The cement compositions (concretes) of Examples 2, 4 and 6 exhibited an increase in compressive strength over the control concrete of Example 8. At ages beyond 28 days, it would be normally be expected that the concrete samples of the invention Examples 2, 4, and 6) would exhibit an increasing improvement over the control concrete (Example 8). The strength results are deemed to be very good and meet the level of strength gain achieved routinely with control concrete of moderate to high strength despite having only 2%-4% cement content, as contrasted to a 12% cement content of the control sample. The cement composition of the invention has two to three times the compressive strength of standard cement.

Conclusion: The addition of an enzyme to cement compositions is an effective additive in the development of low, moderate and high strength concretes. By varying the amount of the enzyme added, very high strengths are attainable. It is understood that various cement compositions including an enzyme may be formulated to meet specific construction challenges or applications.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A method of reducing the cost of a cement composition including at least one aggregate by substituting an inexpensive aggregate selected from the group consisting of clay, local soil, and quarry byproducts for a more expensive aggregate selected from the group consisting of gravel, sand and soil in the cement composition, said method comprising the steps of mixing an enzyme with water, and then mixing said enzyme/water mixture with cement and at least one aggregate selected from the group consisting of clay, local soil, and quarry byproducts to form a cement composition, wherein the cement composition has at least the same compressive strength as a standard cement composition.

* * * * *